United States Patent [19]

Wills

[11] Patent Number: 6,002,692
[45] Date of Patent: Dec. 14, 1999

[54] LINE INTERFACE UNIT FOR ADAPTING BROAD BANDWIDTH NETWORK TO LOWER BANDWIDTH NETWORK FABRIC

[75] Inventor: Jeffrey M. Wills, Fairfax, Va.

[73] Assignee: Hyundai Electronics America, San Jose, Calif.

[21] Appl. No.: 08/778,203

[22] Filed: Dec. 30, 1996

[51] Int. Cl.$^6$ .............................. H04L 12/28; H04J 3/16; H04J 13/00
[52] U.S. Cl. ......................... 370/465; 370/465; 370/477; 370/401; 370/538; 395/200; 395/285
[58] Field of Search .................................. 370/391, 395, 370/392, 465, 398, 907, 375, 376, 60, 94, 477, 401, 338; 395/200.6, 285

[56] References Cited

U.S. PATENT DOCUMENTS

| | | | |
|---|---|---|---|
| 4,744,082 | 5/1988 | Fujimura et al. | 370/112 |
| 5,065,396 | 11/1991 | Castellano et al. | 370/84 |
| 5,099,475 | 3/1992 | Kozaki et al. | 370/60 |
| 5,317,561 | 5/1994 | Fischer et al. | 370/16 |
| 5,345,445 | 9/1994 | Hiller et al. | 370/60.1 |
| 5,375,118 | 12/1994 | Rao et al. | 370/60.1 |
| 5,570,348 | 10/1996 | Holden | 370/17 |
| 5,600,469 | 2/1997 | Yamazaki | 359/135 |
| 5,774,453 | 6/1998 | Fukano et al. | 370/231 |
| 5,867,502 | 2/1999 | Chang | 370/477 |

*Primary Examiner*—Michael Horabik
*Assistant Examiner*—Man Phan
*Attorney, Agent, or Firm*—Townsend and Townsend and Crew LLP; Henry K. Woodward

[57] ABSTRACT

Switch architecture is provided for interfacing a high speed broad bandwidth communication network to a communication fabric having a bandwidth which is a fraction of the high speed broad bandwidth with the network and the fabric having different data packet formats. A multiplex/inverse multiplex unit is provided for converting data packets at the first carrier rate and in the first format to data packets in the second format, and a switch converter then converts the data packet headers in the second format into switch format headers for transmission of the data packets through ports of the communication fabric. A splitter receives the data packets from the switch converter and routes the data packets to one of a plurality of the fabric ports in accordance with the connection identifier in the switch format header, the data packets to one of a plurality of fabric ports being at a second carrier rate. A sequencer receives data packets from a plurality of fabric ports at the second carrier rate and includes a resequencing circuit for split data packets received from the plurality of fabric ports. A second switch converter converts the data packet headers received from the sequencer into data packet headers in the second format, and the second format converter receives and converts the data packets from the second switching converter at the second carrier rate into data packets in the first format and at the first carrier rate. The multiplex/inverse multiplex unit can be used to adapt any high rate data stream to a lower rate switch fabric data stream.

14 Claims, 5 Drawing Sheets

Block diagram of the TEAL switch architecture

FIG. 1A
(PRIOR ART)

Functional block diagram of the line interface module

Switch Fabric Block Diagram

FIG. 3
(PRIOR ART)

Switching element architecture

FIG. 4
(PRIOR ART)

Interfacing of the OC-48c LIM with ATM switch fabric
*FIG. 5*

Block diagram of the inverse multiplexer
*FIG. 6*

Splitter Block Diagram
*FIG. 7*

Sequencer circuit
FIG. 8

Cell Holder and Sequence Number control
FIG. 9

LINE INTERFACE UNIT FOR ADAPTING BROAD BANDWIDTH NETWORK TO LOWER BANDWIDTH NETWORK FABRIC

CROSS-REFERENCE TO RELATED APPLICATIONS

This application is related to the following copending applications:

Ser. No. 08/774,536, filed Dec. 30, 1996, "Distributed Buffering System for ATM Switches"; and Ser. No. 08/777,438, filed Dec. 30, 1966, "ATM Switch Queuing System".

BACKGROUND OF THE INVENTION

This invention relates generally to communications technology, and more particularly, the invention relates to the interfacing of a broad band network to a lower bandwidth network fabric. In an illustrative application, a synchronous optical network (SONET) is interfaced with an asynchronous transfer mode (ATM) network fabric.

The communications industry is rapidly expanding in network technologies for the broad band transmission of voice, video and data. Two such technologies are SONET, which is a high speed synchronous carrier system based on the use of optical fiber technology, and ATM which is a high speed low delay multiplexing and switching network. SONET is high speed, high capacity and suitable for large public networks, whereas ATM is applicable to a broad band integrated services digital network (BISDN) for providing convergence, multiplexing, and switching operations.

Figure 1A:
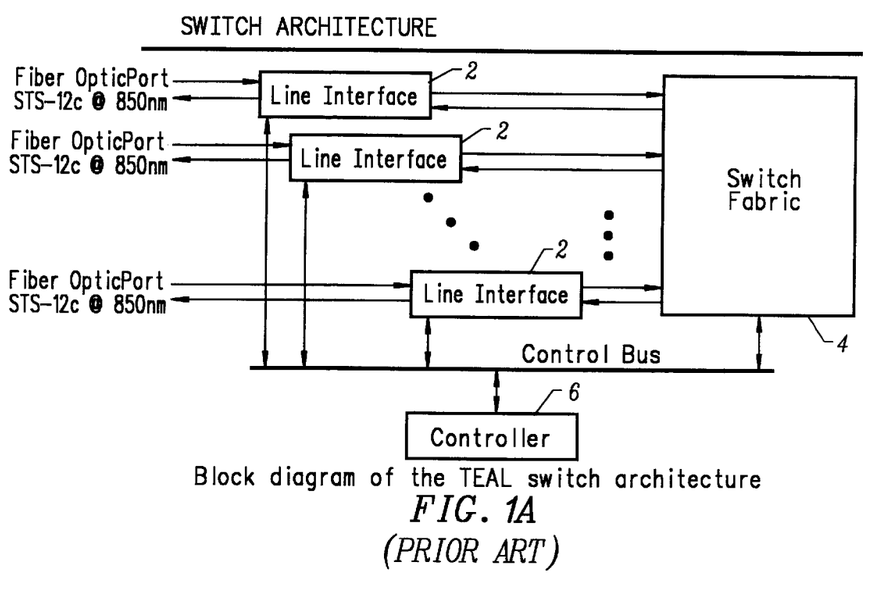
FIG. 1A is a functional block diagram of a switch hardware in which the invention can be employed.

Disclosed in FIG. 1A and in copending patent application 939A-358, supra, is a switch architecture including line interface units (LIMs) 2, a switch fabric 4, and a controller 6. The data path for cells traveling through an ATM network is to enter the line interface, pass through the fabric, and then exit through another line interface.

For signaling and management functions, cells are removed from the outgoing stream and sent to the controller. The controller can also transmit cells through the network by passing the cells to a LIM. The cells are then transmitted through the fabric and finally transmitted out an exit line interface. Passing control through the fabric before going to the controller or leaving the switch allows multiple controllers to each monitor a small number of line interfaces with call control and network management message passed to a centralized processor when the architecture is expanded to a larger number of ports.

Figure 1B:
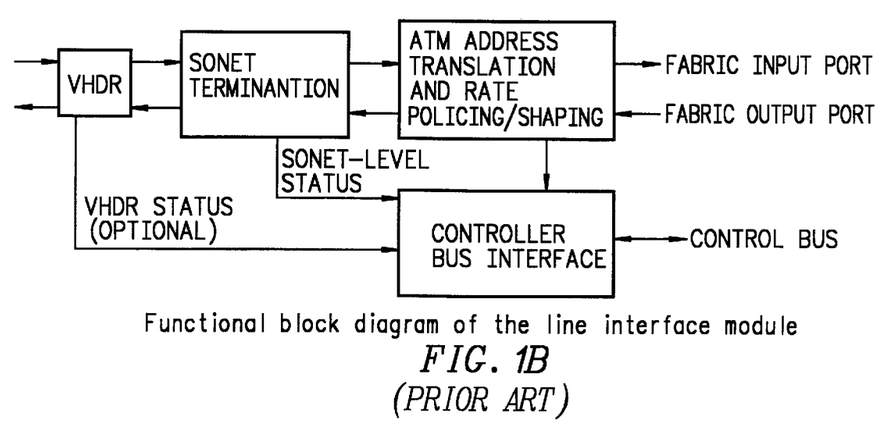
FIG. 1B is a functional block diagram of a line interface module of FIG. 1A.

FIG. 1B is a functional block diagram of a line interface which supports all by-line and by-connection functions including physical layer link termination, translation of ATM header information into routing tags for use by the fabric, policing of traffic, and cell rate decoupling (insertion and deletion of unassigned cells). The interface also measures cell loss, cells tagged, cells passed and the number of cells dropped for each connection. The controller configures and monitors the line interface and the fabric components, and also provides all call access control functions including call set-up, maintenance, and tear-down. It processes the information measured by the line interface to maintain connection and link statistics for network management.

Figure 2:
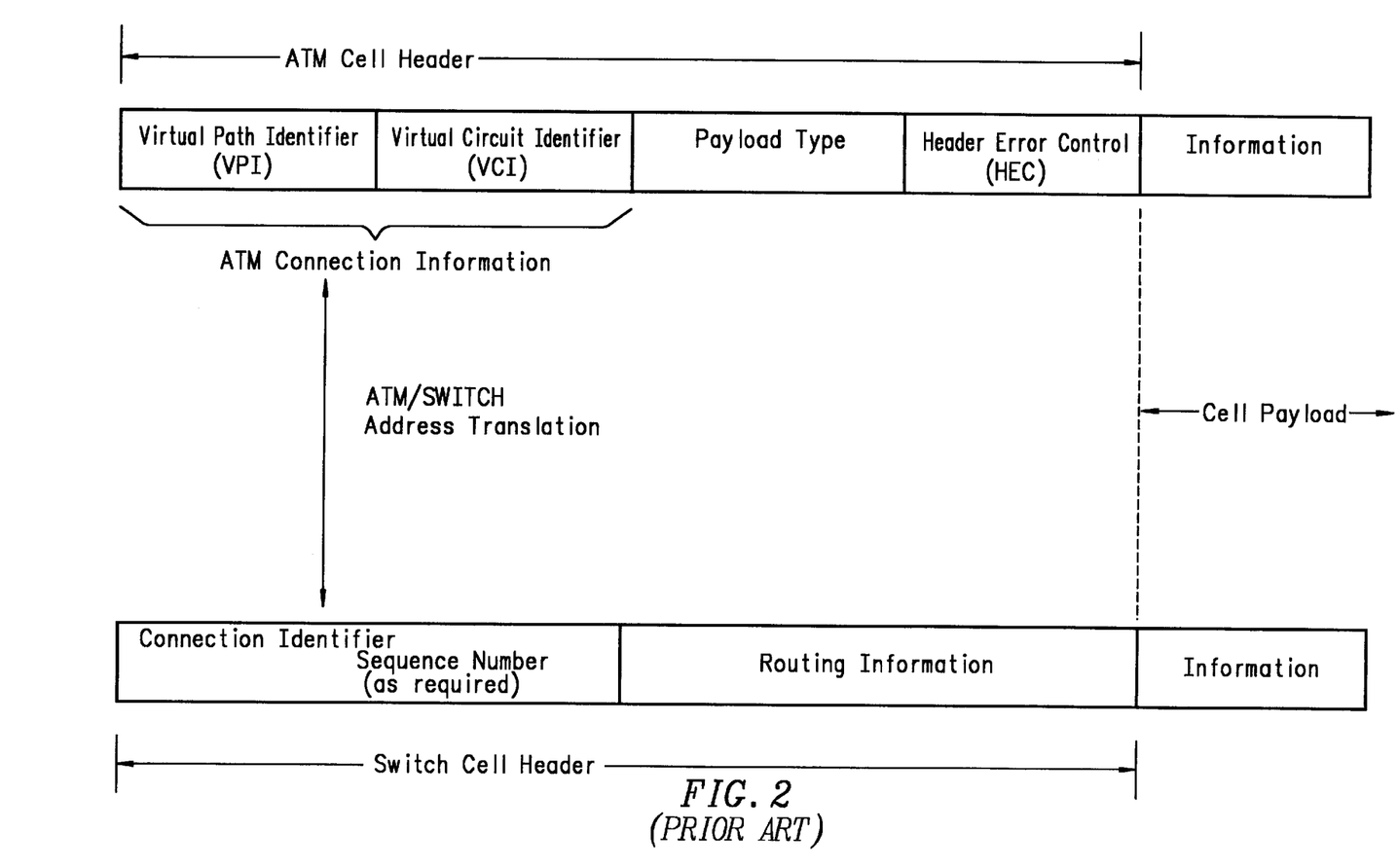
FIG. 2 illustrates an ATM cell header and a switch cell header as used in the switch and line interface module of FIGS. 1A, 1B.

FIG. 2 illustrates connection information in the ATM header and the switch cell header used internally within the switch itself. An ATM header contains a virtual path identifier (VPI) and a virtual circuit identifier (VCI) which together uniquely denote a single connection between two communicating entities. Other information, including a payload type and header error control fields, is included for use by the network in transporting the cells.

The switch header contains a connection identifier to denote the connection. A portion of the connection identifier may be replaced by a sequence number as described later in this document. Additionally, the switch header contains routing information so that the cell can be routed through the switch fabric 4 of FIG. 1A.

The ATM address translation and rate policing/shaping block (see FIG. 1B) converts cells between the two formats by mapping each bit pattern formed by a combination of VPI and VCI fields in the ATM header to a specific connection identifier in the internal switch header.

Therefore, cells that enter the switch have the ATM header removed and replaced with a switch header determined by the combination of the VPI and VCI fields in the ATM header. After those cells have been routed through the switch fabric, the switch header is replaced by an ATM header with the VPI and VCI fields set according to the value of the connection identifier.

Figure 3:
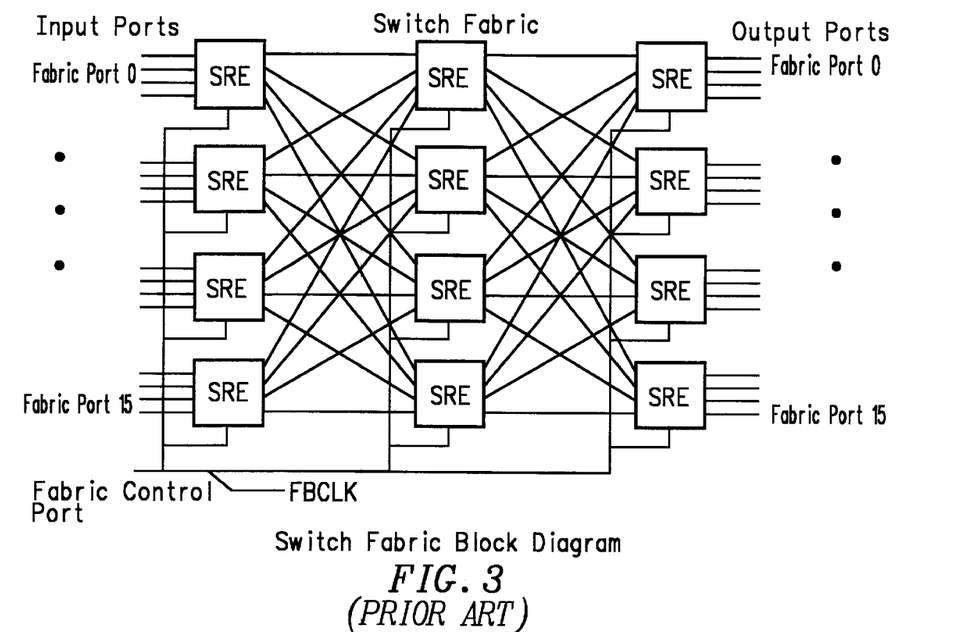
FIG. 3 is a functional block diagram of a switch fabric in FIG. 1.

FIG. 3 illustrates the switch fabric which routes cells to the proper outputs and maintains queue-level statistics on congestion, the number of cell periods during which backpressure is applied, and cell loss. The fabric is a 16 port buffered Beñes interconnection network with 4×4 switch routing elements. In cell routing, as each cell passes through each individual switch routing element (SRE) from input to output, the SRE routes it to the proper output(s), depending on settings of bits within the routing tag. The fabric control port, which is directly connected to the control bus, allows the controller to program the SREs, and read their status. The fabric base clock (FBCLK) sets the rate at which data are acted on by the SREs, and transferred from one SRE to the next. This determines the internal link rate of the fabric.

Figure 4:
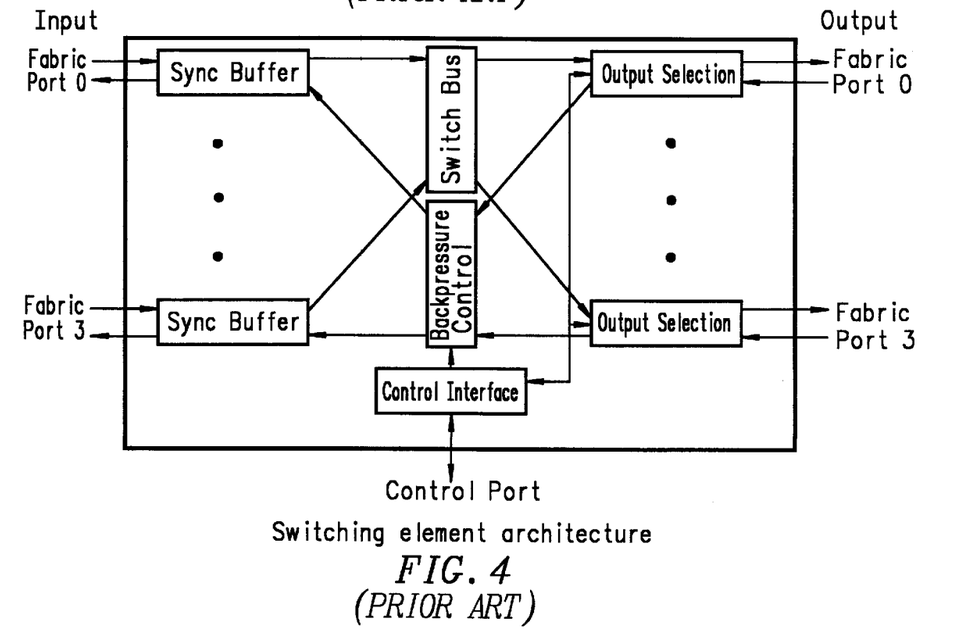
FIG. 4 illustrates switching element architecture.

As illustrated in FIG. 4, the switch routing element (SRE) is a 4×4 fully non-blocking routing element. Cells are clocked into each sync buffer at the rate they are transmitted by the sender. The data from the four sync buffers is multiplexed through the switch bus. The output selection blocks read the routing tag for each cell, and route the tag towards the respective output ports if the pattern matches the bit pattern for that port. Two levels of priority are supported by the output selection block. If its buffer fills beyond a programmable threshold, the output selection block may be programmed to SEND an overflow signal to the backpressure control block. Cells are simply dumped if the output selection block buffer overfills. Upon receiving a backpressure signal from outside the SRE, the output selection block may be programmed to ignore the signal, or slow the rate of data transfer through that port. Upon receiving a backpressure indication, the backpressure control block routes the signals to one or more sync buffers which synchronize the signal with the incoming data block.

Each SRE is individually addressed and maintains statistics on the number of cells dropped per output buffer, the number of cells tagged with FCI per output buffer, and the current state of each output buffer. Each output buffer can be programmed as to which type of routing field (selection or multitask) it uses and to where the routing field used for cell routing is located within the routing tag. This field can be read by the control processor. The SRE as a whole can be programmed to select a backpressure mode and this field can be read by the control processor.

The present invention is directed to a multiplexer/inverse multiplexer for use in a switch architecture as described above wherein the information to and from a high speed broad bandwidth network is transferred through a lower speed switch fabric. More particularly, the inverse multiplexing allows the use of switches that can be optimized for most common traffic rates.

In U.S. Pat. No. 5,065,396, a high rate data stream is split into multiple output connections into which timing signals are periodically inserted. At the destination, the timing signals are checked and used to multiplex the received signals into a single data stream. This approach works only on continuous data streams, like those found in T1 lines or SONET links. Furthermore, the approach requires that the transit delays of subpaths remain constant. The proposed approach allows both the rate of the inverse multiplex data stream to vary as well as the delays of the subpath.

In U.S. Pat. No. 5,317,561, the incoming data is split over multiple fabrics, with the individual cells marked with sequence numbers. At the output of the fabrics, the multiple streams are re-sequenced to produce the output. A primary disadvantage of this scheme is that multiple fabrics are required to carry a single port, rather than allowing multiple ports on the same fabric to be used for a higher rate connection. Another disadvantage is that only a single high rate data stream is split over the multiple ports.

SUMMARY OF THE INVENTION

In accordance with the present invention, a line interface until including a multiplexer/inverse multiplexer is provided which operates on asynchronous data streams. The rate of initial data stream may vary, ranging from no cells per second for long periods to full rate data bursts, with relative transmission delays of the multiple lower rate paths varying with time while data is being transmitted. The multiplexer/inverse multiplexer uses multiple ports on a single switching matrix or fabric so that the fabric may be used for lower rate connections as well. Further, multiple connections are allowed with different destinations through multiplexing on the same input port. If multiple connections are inverse multiplexed, the rate of each connection can vary with time.

In one embodiment of the invention, an interface is designed for a SONET network utilizing optical carrier OC-48c frames in a 2.488 Gbps carrier and an ATM switch fabric with ports operating at 622 Mbps (OC-12c). In this embodiment, an optical transceiver converts the OC-48c optical signal into electrical signals which are applied to a converter of the SONET frame stream into a stream of ATM cells. The ATM cell headers are then converted into switch format headers. The ATM traffic can be split into multiple priorities so that critical traffic maintains quality of service (QoS).

A splitter receives the ATM traffic and checks a connection identifier in each switch header. If a cell is from a connection that is split among multiple paths, the splitter places a sequence number (for that connection) in the connection identifier and routes the cell to the fabric port based on the lower two bits of the sequence number. If a cell is not from a split connection, it is simply routed to the fabric port corresponding to the lower two bits of the connection identifier. In the event that back pressure is applied to the LIM by one of the fabric ports, the splitter halts the flow of cells through all of the fabric ports to minimize the relative path delays for the split connections.

A sequencer is provided for checking the connection identifier in the switch header. If a cell is from a connection that is split among multiple paths, it is routed towards a resequencing circuit. Otherwise the cell is sent directly to the output. The resequencing circuit uses the sequence numbers in the switch header to merge the cells from the fabric ports so that they leave in the order in which sequence numbers were assigned to them.

The invention and objects and features thereof will be more readily apparent from the following detailed description and appended claims when taken with the drawings.

DETAILED DESCRIPTION OF THE ILLUSTRATIVE EMBODIMENTS

Figure 5:
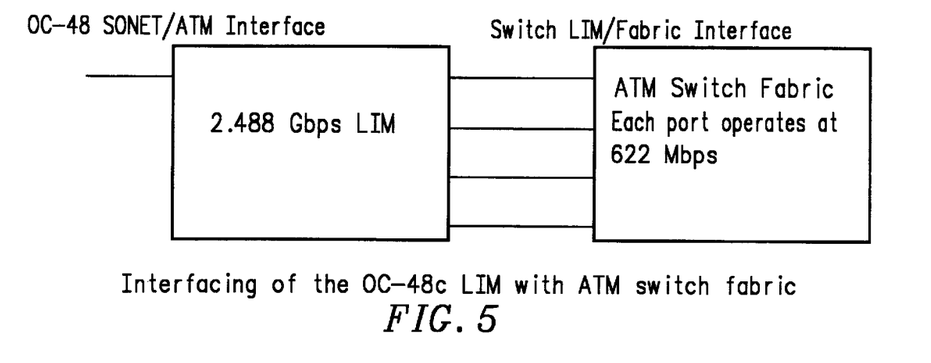
FIG. 5 illustrates an interface multiplexer/inverse multiplexer in accordance with an embodiment of the invention.

Referring now to the drawings, FIG. 5 is a functional block diagram of the interfacing of an optical network (SONET OC-48c), having a carrier frequency of 2.488 Gbps with an ATM switch fabric having 4 ports operating at 622 Mbps or one fourth the carrier frequency of the SONET carrier. The higher speed links are needed for connections between an ATM network and superconductors, file and computer servers, and between switches on a network backbone. A multiplexer/inverse multiplexer interface in accordance with the invention allows the use of switches that are constructed for lower, more common data rates in more demanding applications. Therefore, the switches can be optimized for the most common traffic rate.

Figure 6:
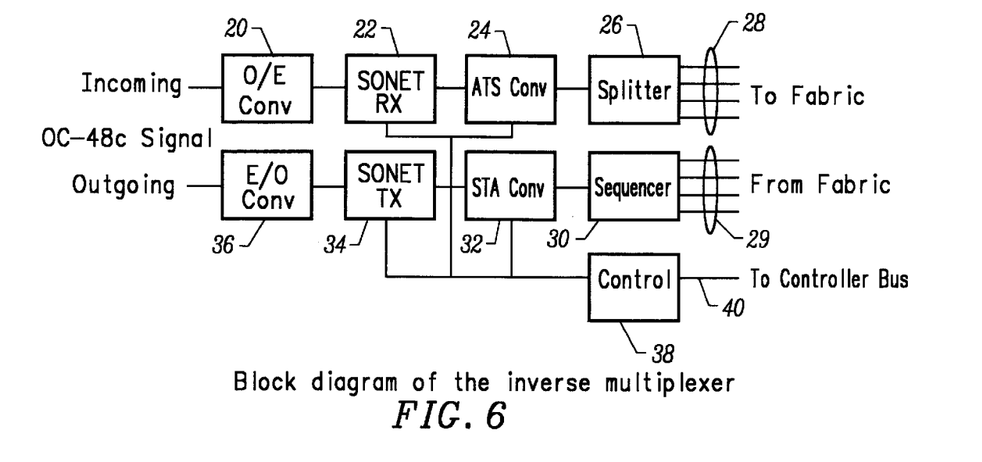
FIG. 6 is a functional block diagram of the multiplexer/inverse multiplexer in accordance with one embodiment of the invention.

FIG. 6 is a block diagram of the multiplexer/inverse multiplexer. The incoming OC-48c SONET signal is converted to electrical signals by an optoelectronic converter 20. The output, which is a stream of STS-48c SONET timing frames, is fed into the SONET receiver circuit 22 which synchronizes to the SONET frame and retrieves ATM cells. The ATM cells are then fed to the ATM to switch converter (ATS Conv) circuit 24 which translates the ATM headers into switch format headers. These cells are then fed into a splitter block 26 which routes the cells onto four output ports 28 to the fabric, each port operating at 622 Mbps.

A sequencer circuit 30 receives cells from the switch fabric ports 29 and combines them into a single outgoing cell stream. Cells from connections that were split among multiple paths in the fabric are merged in such a manner that the cells have the same order at the output as they did on arriving at the switch. A switch to ATM converter 32 translates the switch format headers on cells from the Sequencer into ATM headers. A SONET transmitter 34 then creates a SONET frame and inserts the cells into it to produce an STS-48c SONET stream. An electrical-optical converter 36 converts the electrical signal into an optical signal which it broadcasts over the outgoing fiber link.

A control circuit 38 interrogates the status of the SONET transceiver circuits 22, 34 and programs an ATM-switch format translation table. The control circuit is connected to the controller within the switch through a controller bus 40.

More particularly, the optical transceiver 20, 36, converts OC-48 optical signals into emitter couple logic (ECL) compatible electrical signals. The SONET transceiver circuitry 22, 34 converts SONET STS-48 data stream into a stream of ATM cells. The circuitry performs all bit sync, frame sync, and SONET overhead generation and processing. The ATM to switch converter 24 converts the ATM cell headers (both user network interface and a network network interface format) into switch format headers. The converter also splits the traffic into multiple priorities so as to assure quality of service (QoS) for timing critical traffic.

The switch to ATM converter 32 converts the switch format headers into ATM cell headers (user network interface and network network interface formats). The converter also splits the traffic into multiple priorities so that timing critical traffic maintains QoS. The splitter 26 checks the connection identifier in the switch header. If a cell is from a connection that is split among multiple paths, it places a sequence number (for that connection) in the connection identifier and routes the cell to the fabric port based on the lower two bits of the sequence number. If a cell is not from a split connection, it is simply routed to the fabric port corresponding to the lower two bits of the connection identifier.

In the event that backpressure is applied to the line interface module by one of the fabric ports to which it is connected, the splitter halts the flow of cells through all of the fabric ports to minimize the relative path delays for the split connections.

Sequencer 30 checks the connection identifier in the switch header. If a cell is from a connection that is split among multiple paths, it is routed towards a resequencing circuit, otherwise the cell is sent directly to the output. The resequencing circuit uses the sequence numbers in the switch header to merge the cells from the fabric ports so that they leave in the order in which the sequence numbers were assigned to them.

Figure 7:
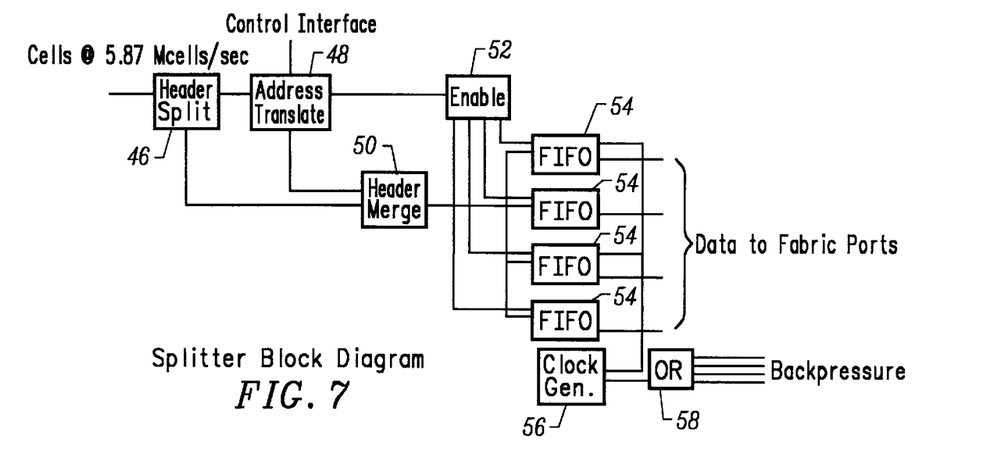
FIG. 7 is a functional block diagram of a splitter circuit in the multiplexer/inverse multiplexer of FIG. 6.

FIG. 7 is a more detailed functional block diagram of splitter 26. As described in co-pending application 939A358, when the fabric becomes congested due either to traffic from the 2.488 Gbps line interface module or other ports, backpressure is applied to selected ports to reduce the output rate of cells to the rate at which the fabric can accept them. The 2.488 line interface module features four output ports and the output rate of all four ports are preferably reduced when the fabric applies backpressure to minimize the amount of differential delay among the four paths for split connections. When the fabric applied backpressure to the splitter, it may apply backpressure independently on one or more of the four fabric ports. In the first instance, the backpressure applies only to the splitter output port that feeds the asserting fabric port. Alternatively, backpressure stops traffic from leaving all four of the four splitter output ports. However, stopping all splitter output when even a single fabric port asserts backpressure reduces the differential delay between paths for split connections, which reduces both the amount of buffering required in the sequencer and the length of the sequence numbers, as well as allowing for continued transfer of nonsplit connection data unless the splitter buffer is full.

Looking now to FIG. 7, a header split 46 receives ATM cells at 5.87 Mcells/second and it separates cell headers from payloads in the ATM cells. The ATM headers (minus Header Error Controller or HEC) are delivered to an address translate block 48, and the ATM payloads are delivered to a header merge block 50.

The address translate block 48 translates the header (minus HEC) into a switch routing tag. The tag identifies those connections which are split and assigns a sequence number as the least significant part of the connection identifier (CONNID). The lower two bits of the CONNID identify which fabric port receives the cell.

Header merge 50 merges a cell payload and routing tag into a cell format for the fabric. An enable unit 52 enables the input of one of FIFO buffers 54 that is enumerated by the least significant two bits of the CONNID. The FIFO buffers 54 buffer cells that are directed for a given fabric port. The buffers must be able to sustain short bursts of traffic at OC-48 that will go to the fabric port.

A clock generator 56 clocks cells out of the FIFO buffers and into the fabric. The clock rate needs to be the maximum rate the fabric can support to allow the FIFO buffers 54 to handle short bursts of traffic at OC-48c.

OR gate 58 combines all backpressure signals from the fabric into a single clock enable. Therefore, all ports are throttled due to one backpressure signal from one fabric port.

Figure 8:
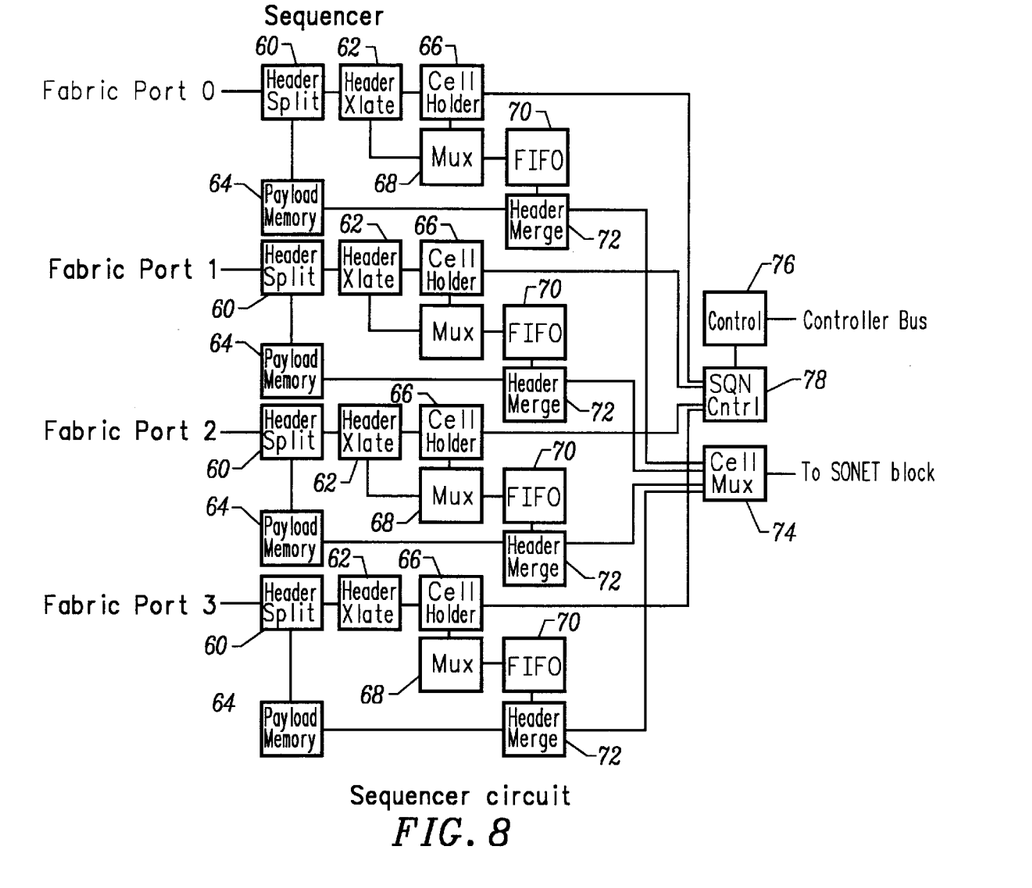
FIG. 8 is a functional block diagram of a sequencer circuit in the multiplexer/inverse multiplexer of FIG. 6.

FIG. 8 is a more detailed functional block diagram of the sequencer 30 of FIG. 6. Normally, a LIM has an elastic buffer that lies between the fabric output port and the physical output port. When the buffer becomes nearly full, the LIM asserts backpressure towards the fabric port to slow down the transfer of cells to what the output buffer can accommodate. In the case of the 2.488 LIM, four such ports are supplied; however, it is preferred to allow each of the LIM input ports assert backpressure independently. When the merger applies backpressure to the fabric, it should apply backpressure only to the fabric port for a merger buffer for the path that is full. In the case where a single output buffer fill up occurs when a single path has a delay much shorter than other paths, slowing down the single path decreases the relative delay between the fabric paths whereas throwing down the other paths simply makes worse the congestion and the resulting delay.

In FIG. 8, four header splitters 60 are provided for the fabric ports 0–3. The header splitter separates a routing tag from the cell payload and routes the routing tag and payload pointer to a header translate block 62. The header splitter 60 stores the payload in a payload memory 64.

The header translator 62 translates the connection identifier in the routing tag into an ATM header (minus HEC). The header translator also determines whether a cell is from a split connection and if so, it sends the ATM header, the pointer to the payload, and the sequence number to a cell holder 66. If the cell is not from a split connection, the header translator transfers the ATM header and payload pointer to a MUX unit 68.

The cell holder 66 holds an ATM cell holder and payload pointer until the proper sequence number is ready to transmit. When a cell is ready to be transmitted, the cell holder transfers the ATM header (minus HEC) and payload pointer to MUX 68.

MUX 68 multiplexes the stream of ATM headers and payload pointers, from split and non-split connections according to a priority scheme. MUX 68 transfers the ATM headers and payload pointers to FIFO buffers 70 which provides a multiple priority queue.

A header merge unit 72 reads the ATM header and payload pointer from FIFO buffer 70 and reads the payload from the payload memory 64 which is capable of holding at least 2,000 cells of payload. The full cell is then transmitted by the header merge unit 72 to a cell MUX unit 74, which multiplexes the cells from the four ports into a single stream for transmission into the SONET block downstream.

A control unit 76 interfaces between the sequencer circuitry and the switch controller 6, and a sequence control unit 78 coordinates the cell releases for the cell holder, as will be described with reference to FIG. 9.

Figure 9:
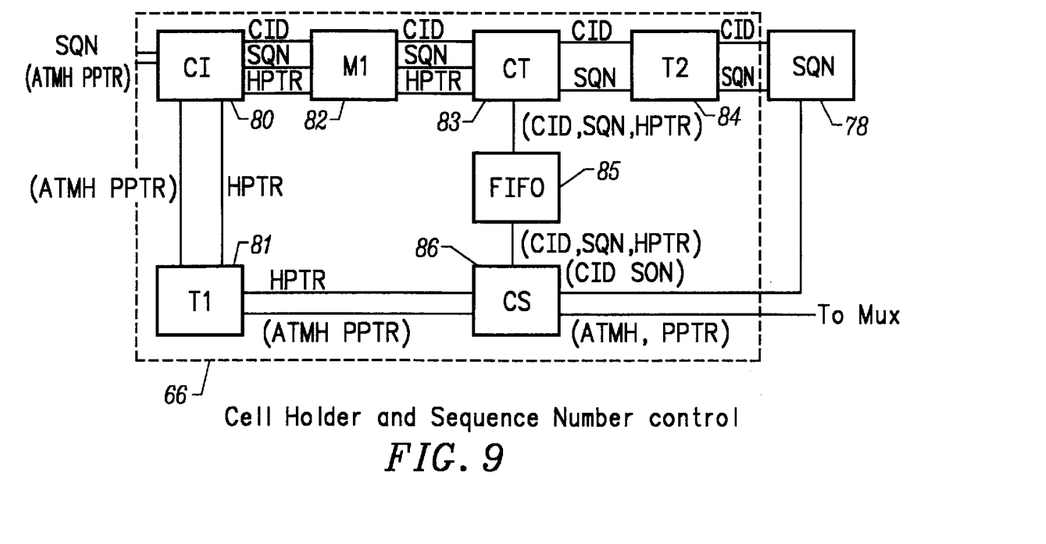
FIG. 9 is a functional block diagram of a cell holder and sequence number controller in the sequencer circuit of FIG. 8.

Referring now to FIG. 9, a more detailed block diagram of a cell holder 66 is illustrated. A cell insert unit 80 converts an ATM header into a connection identifier or CONNID. The unit pools together the ATMH and the payload pointer (PPTR) into a single data entity (64 bit) and places the entity into the next table slot in a first table 81, labelled T1, which is denoted by HPTR. The cell unit then determines the next entry in a memory 82 for this connection identifier and inserts the HPTR and the sequence number (SQN) into that slot.

Memory 82, designated M1, is a complex memory which stores the list of cells received by the cell holder in the order in which they are received and maintains the SQN as well.

Table T1, labelled 81, is a table used to hold the ATM header and payload pointer for the cell until the output is ready to receive the cell.

A cell test unit (CT) 83 cycles through the connection identifiers (CONNIDS) in a table T2, labeled 84, testing the SQN stored there against an SQN of the leading cell for that connection. If there is a match, the CONNID, SQN, and HPTR for that cell are passed to a FIFO unit 85, and the corresponding cell entry in memory 82 is deleted. If no match is found, the cell test proceeds to the next cell. Table T2 stores the next sequence number expected for the given port by a connection identifier.

FIFO 85 holds the [CID, SQN] and HPTR generated by the CT block 83 until a cell send (CS) unit 86 is ready for them, as the cell test 83 can at times run faster than the cell send unit 86. Cell send unit 86 takes the HPTR from FIFO 85 and reads the ATMH and PPTR at that location. The CONNID and SQN are sent to the sequencer unit 78, signifying that a cell has made it through the cell holder and sends the PPTR and ATMH to the MUX block 68 (FIG. 8).

As described above with reference to FIG. 8, the sequence controller 78 coordinates the cell releases for the cell holders.

The described line interface unit including a multiplexer/inverse multiplexer provides a switch interface between a high speed broad band network such as SONET, and a lower bandwidth ATM network by converting the SONET frames to ATM cell formats and then splitting the ATM cells for the lower speed ATM network. The transmitted cells from the network are then converted to proper sequence for conversion to SONET frames for return to the high speed higher bandwidth network. While the invention has been described with reference to a specific embodiment, the description is illustrative of the invention and is not to be construed as limiting the invention. The invention is obviously applicable to networks other than SONET and ATM, and the invention is applicable to other bandwidths and carrier frequencies. Thus, while the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A line interface unit for interfacing a first data stream and a first format and at a first carrier rate to multiple ports of a switch fabric in a second format and at a second carrier rate, said second carrier rate being a fraction of said first carrier rate, said unit comprising:

a first format converter for converting data packets at said first carrier rate and in said first format to data packets in said second formats;

a first switch converter for converting data packet headers in said second format into switch format headers;

a splitter for receiving data packets from said switch converter and routing said data packets from one of a plurality of fabric ports in accordance with a connection identifier in the switch format header, said data packets as routed to one of a plurality of fabric ports being at said second carrier rate, said splitter including:

a header split unit for receiving data packets from said first format converter and for separating data packet headers from data packet payloads;

an address translate unit for translating data packet headers from said header split unit into a switch routing tag and identifying data packet connections which are split and assigning a sequence number as part of a connection identifier (CONNID);

a header merge unit for receiving and merging data packet payloads from said header split unit and routing tags from said address translate unit;

a plurality of buffers for said fabric ports connected to receive merged data packet payloads and routing tags from said header merge unit; and an enable unit responsive to said address translate unit for enabling an input of one of said plurality of buffers in accordance with a connection identification;

a sequencer for receiving data packets from a plurality of fabric ports at said second carrier rate, and including a resequencing circuit for split data packets received from a plurality of fabric ports; said sequencer comprising a plurality of header splits units, each associated with a fabric port for separating a routing tag from a data packet payload;

a header translate unit for each header split unit for translating a connection identification (CONNID) into a header in said second format and determining if a data packet is from a split connection;

a data packet holder for receiving from the header translate unit and holding a data packet header and payload pointer until a proper sequence number is received to transmit;

a MUX unit for multiplexing a stream of payload headers from the header translate unit in response to payload pointers from a data packet holder;

a buffer for storing a queue of data packet headers and payload pointers from the MUX unit;

a payload memory for each header split unit for storing data packet payloads;

a header merge unit associated with each payload memory for reading a header and a pointer from the buffer, and a payload from the payload buffer and then transmitting a full data packet to a data packet MUX unit;

a data packet MUX unit for receiving and multiplexing full data packets from header merge units for each fabric port for transmission to said second format converter; and a sequence control unit coupled to each data packet holder and coordinating the release of data packets;

a second switch converter for converting data packet headers received from said sequencer into data packet headers in said second format; and a second format converter for receiving and converting data packets from said second switch converter at said second carrier rate into data packets in said first format and at said first carrier rate.

2. The line interface unit as defined by claim 1, wherein said data packet holder includes:

a cell insert unit for converting a data packet header into a connection identification (CONNID);

a first memory for storing a list of data packets received by the data packet holder in the order received and storing sequence numbers;

a first table coupled to the cell insert unit for holding a payload header and pointer for a data packet;

a second table for storing a next sequence number expected from a port by the connection identification;

a cell test unit coupled to the second table and to the first memory for cycling through connection identifications in the second table and testing sequence numbers against the sequence number in the leading data packet for the connection, and in response to a match then passing to a buffer the connection identification, the sequence number, and the header and pointer for a data packet;

a buffer for receiving from the cell test unit a connection identification, a sequence number, and a header and pointer for a data packet; and a data packet transfer unit coupled to the buffer and to the first table, using the header and packet in the buffer to read a data packet header and payload pointer from the first table and sending to the sequence control unit the connection identification and sequence number, and sending to the data packet MUX unit, the payload pointer and header.

3. The line interface unit as defined by claim 2, wherein said data stream in said first format is in synchronous optical format (SONET) and said data stream in said second format is asynchronous transfer mode (ATM) format.

4. The line interface unit as defined by claim 3, wherein said SONET data stream has a carrier frequency of 2.488 Gbps and said ATM data stream has a carrier frequency of 622 Mbps.

5. The line interface unit as defined by claim 3, and further including an optical to electrical signal converter for converting an optical first data stream into an electrical first data stream for said first format converter, and an electrical to optical signal converter for converting an electrical first data stream from said second format converter to an optical first data stream.

6. A line interface unit for interfacing a first data stream and a first format and at a first carrier rate to multiple ports of a switch fabric in a second format and at a second carrier rate, said second carrier rate being a fraction of said first carrier rate, said unit comprising:

a first format converter for converting data packets at said first carrier rate and in said first format to data packets in said second formats;

a first switch converter for converting data packet headers in said second format into switch format headers;

a splitter for receiving data packets from said switch converter and routing said data packets from one of a plurality of fabric ports in accordance with a connection identifier in the switch format header, said data packets as routed to one of a plurality of fabric ports being at said second carrier rate;

a sequencer for receiving data packets from a plurality of fabric ports at said second carrier rate, and including a resequencing circuit for split data packets received from a plurality of fabric ports; said sequencer comprising a plurality of header split units, each associated with a fabric port for separating a routing tag from a data packet payload;

a header translate unit for each header split unit for translating a connection identification (CONNID) into a header in said second format and determining if a data packet is from a split connection;

a data packet holder for receiving from the header translate unit and holding a data packet header and payload pointer until a proper sequence number is received to transmit;

a MUX unit for multiplexing a stream of payload headers from the header translate unit in response to payload pointers from the data packet holder;

a buffer for storing a queue of data packet headers and payload pointers from the MUX unit;

a payload memory for each header split unit for storing data packet payloads;

a header merger unit associated with each payload memory for reading a header and a pointer from the buffer, and a payload from the payload buffer and then transmitting a full data packet to a data packet MUX unit;

a data packet MUX unit for receiving and multiplexing full data packets from header merge units for each fabric port for transmission to said second format converter; and a sequence control unit coupled to each data packet holder and coordinating the release of data packets;

a second switch converter for converting data packet headers received from said sequencer into data packet headers in said second format; and a second format converter for receiving and converting data packets from said second switch converter at said second carrier rate into data packets in said first format and at said first carrier rate.

7. The line interface unit as defined by claim 6, wherein said data packet holder includes:

a cell insert unit for converting a data packet header into a connection identification (CONNID);

a first memory for storing a list of data packets received by the data packet holder in the order received and storing sequence numbers;

a first table coupled to the cell insert unit for holding a payload header and pointer for a data packet;

a second table for storing a next sequence number expected from a port by the connection identification;

a cell test unit coupled to the second table and to the first memory for cycling through connection identifications in the second table and testing sequence numbers against the sequence number in the leading data packet for the connection, and in response to a match then passing to a buffer the connection identification, the sequence number, and the header and pointer for a data packet;

a buffer for receiving from the cell test unit a connection identification, a sequence number, and a header and pointer for a data packet; and a data packet transfer unit coupled to the buffer and to the first table, using the header and packet in the buffer to read a data packet header and payload pointer from the first table and sending to the sequence control unit the connection identification and sequence number, and sending to the data packet MUX unit, the payload pointer and header.

8. The line interface unit as defined by claim 7, wherein said data stream in said first format is in synchronous optical format (SONET) and said data stream in said second format is asynchronous transfer mode (ATM) format.

9. The line interface unit as defined by claim 8, wherein said SONET data stream has a carrier frequency of 2.488 Gbps and said ATM data stream has a carrier frequency of 622 Mbps.

10. The line interface unit as defined by claim 8, and further including an optical to electrical signal converter for converting an optical first data stream into an electrical first data stream for said first format converter, and an electrical to optical signal converter for converting an electrical first data stream from said second format converter to an optical first data stream.

11. The line interface unit as defined by claim 6, wherein said first switch converter splits data packets into multiple priorities in accordance with data packet headers.

12. The line interface unit as defined by claim 6, wherein said splitter includes:

a header split unit for receiving data packets from said first format converter and for separating data packet headers from data packet payloads;

an address translate unit for translating data packet headers from said header split unit into a switch routing tag and identifying data packet connections which are split and assigning a sequence number as part of a connection identifier (CONNID);

a header merge unit for receiving and merging data packet payloads from said header split unit and routing tags from said address translate unit;

a plurality of buffers for said fabric ports connected to receive merged data packet payloads and routing tags from said header merge unit; and an enable unit responsive to said address translate unit for enabling an input of one of said plurality of buffers in accordance with a connection identification.

13. The line interface unit as defined by claim 6, and further including a clock generator coupled to said plurality of buffers for clocking outputs of the buffers.

14. The line interface unit as defined by claim 13, and further including gate means for receiving backpressure signals from the fabric and in response thereto controlling said clock generator.

* * * * *